United States Patent
Higashiyama (10) Patent No.: US 7,823,406 B2
(45) Date of Patent: Nov. 2, 2010

(54) HEAT EXCHANGER

(75) Inventor: Naohisa Higashiyama, Oyama (JP)

(73) Assignee: Showa Denko K. K., Tokyo (JP)

( * ) Notice: Subject to any disclaimer, the term of this patent is extended or adjusted under 35 U.S.C. 154(b) by 968 days.

(21) Appl. No.: 11/571,831

(22) PCT Filed: Jul. 15, 2005

(86) PCT No.: PCT/JP2005/013529

§ 371 (c)(1),
(2), (4) Date: Jan. 9, 2007

(87) PCT Pub. No.: WO2006/006743

PCT Pub. Date: Jan. 19, 2006

(65) Prior Publication Data

US 2008/0053137 A1    Mar. 6, 2008

Related U.S. Application Data

(60) Provisional application No. 60/588,986, filed on Jul. 20, 2004, provisional application No. 60/618,190, filed on Oct. 14, 2004.

(30) Foreign Application Priority Data

Jul. 15, 2004  (JP) ............................ 2004-207980
Oct. 8, 2004   (JP) ............................ 2004-295542

(51) Int. Cl.
   *F25B 13/00*    (2006.01)
(52) U.S. Cl. ....................... 62/324.6; 62/515
(58) Field of Classification Search ............... 62/324.6, 62/515; 165/62, 166, 167, 174, 175, 176, 165/153

See application file for complete search history.

(56) References Cited

U.S. PATENT DOCUMENTS

| 6,193,140 | B1 * | 2/2001 | Suzuki et al. | 228/183 |
| 6,216,777 | B1 * | 4/2001 | Rhodes et al. | 165/176 |
| 6,536,517 | B2 * | 3/2003 | Hoshino et al. | 165/176 |
| 6,668,137 | B1 * | 12/2003 | Cordina | 398/94 |
| 6,732,789 | B2 * | 5/2004 | Jang | 165/110 |
| 6,766,817 | B2 | 7/2004 | Da Silva | |
| 6,918,404 | B2 | 7/2005 | Da Silva | |
| 7,066,586 | B2 | 6/2006 | Da Silva | |
| 2002/0023740 | A1 * | 2/2002 | Lowenstein et al. | 165/166 |
| 2003/0116308 | A1 * | 6/2003 | Watanabe et al. | 165/144 |
| 2004/0069477 | A1 * | 4/2004 | Nishikawa et al. | 165/175 |

FOREIGN PATENT DOCUMENTS

| JP | 7 149135 | 6/1995 |
| JP | 2001 255095 | 9/2001 |
| JP | 2003 75024 | 3/2003 |

OTHER PUBLICATIONS

U.S. Appl. No. 11/720,372, filed May 29, 2007, Higashiyama.
Email from Elson Dias Da Silva dated Mar. 25, 2008.

* cited by examiner

*Primary Examiner*—Mohammad M Ali
(74) *Attorney, Agent, or Firm*—Oblon, Spivak, McClelland, Maier & Neustadt, L.L.P.

(57) ABSTRACT

An evaporator including a refrigerant inlet header having a refrigerant inlet at one end thereof, and a plurality of heat exchange tubes arranged at a spacing longitudinally of the inlet header and each having one end joined to the inlet header. The interior of the inlet header is divided by a flow dividing control wall into an upper space for admitting a refrigerant thereinto through the refrigerant inlet and a lower space communicating with the heat exchange tubes. The control wall has a communication hole formed in an end portion thereof opposite to the refrigerant inlet. The upper and lower spaces communicate with each other through the communication hole so that the refrigerant flows through the lower space in a direction opposite to the direction of flow of the refrigerant in the upper space. The evaporator achieves a high heat exchange efficiency.

15 Claims, 9 Drawing Sheets

HEAT EXCHANGER

CROSS REFERENCE TO RELATED APPLICATIONS

This application is an application filed under 35 U.S.C. §111(a) claiming the benefit pursuant to 35 U.S.C. §119 (e)(1) of the filing dates of Provisional Applications No. 60/588,986 and No. 60/618,190 filed Jul. 20, 2004 and Oct. 14, 2004, respectively, pursuant to 35 U.S.C. §111(b).

TECHNICAL FIELD

The present invention relates to heat exchangers, more particularly to heat exchangers suitable to use, for example, as evaporators in motor vehicle air conditioners which are refrigeration cycles to be installed in motor vehicles.

The term "aluminum" as used herein and in the appended claims includes aluminum alloys in addition to pure aluminum. The downstream side (the direction indicated by the arrow X in FIG. 1) of the flow of air to be passed through air passage clearances between respective adjacent pairs of heat exchange tubes of the heat exchanger will be referred to herein and in the appended claims as "front," and the opposite side as "rear."

BACKGROUND ART

Heretofore in wide use as motor vehicle air conditioner evaporators are those of the so-called stacked plate type which comprise a plurality of flat hollow bodies arranged in parallel and each composed of a pair of dishlike plates facing toward each other and brazed to each other along peripheral edges thereof, and a louvered corrugated fin disposed between and brazed to each adjacent pair of flat hollow bodies. In recent years, however, it has been demanded to provide evaporators further reduced in size and weight and exhibiting higher performance.

To meet such a demand, the present applicant has already proposed an evaporator which comprise a heat exchange core composed of tube groups in the form of two rows arranged in parallel in the front-rear direction and each comprising a plurality of heat exchange tubes arranged at a spacing, a refrigerant inlet-outlet header tank disposed at the upper end of the heat exchange core and a refrigerant turn header tank disposed at the lower end of the heat exchange core, the refrigerant inlet-outlet header tank having its interior divided by a partition into a refrigerant inlet header positioned on the front side and a refrigerant outlet header positioned on the rear side, the inlet header being provided with a refrigerant inlet at one end thereof, the outlet header being provided with a refrigerant outlet at one end thereof alongside the inlet, the refrigerant turn header tank having its interior divided by a partition wall into a refrigerant inflow header positioned on the front side and a refrigerant outflow header positioned on the rear side, the partition wall of the refrigerant turn header tank having a plurality of refrigerant passing holes formed therein and arranged longitudinally of the wall at a spacing, the heat exchange tubes of the front tube group having upper ends joined to the inlet header, the heat exchange tubes of the rear tube group having upper ends joined to the outlet header, the heat exchange tubes of the front tube group having lower ends joined to the inflow header, the heat exchange tubes of the rear tube group having lower ends joined to the outflow header. The refrigerant flowing into the inlet header of the inlet-outlet header tank flows through the heat exchange tubes of the front tube group into the inflow header of the turn header tank, then flows into the outflow header through the refrigerant passing holes in the partition wall and further flows into the outlet header of the inlet-outlet header tank through the heat exchange tubes of the rear tube group (see the publication of JP-A NO. 2003-75024).

However, the present inventor has conducted extensive research and consequently found that it is difficult to further improve the performance of the evaporator disclosed in the above publication for the reasons to be described below.

With the evaporator of the above publication, it is easier to give an increased cross sectional area to the channel inside the inlet header and reduced resistance to the channel than in the case of evaporators of stacked plate type. On the other hand, however, this increases the overall internal volume of the inlet header in which heat exchange tube ends are positioned. The evaporator is therefore likely to become slower in responsiveness to the turning on and off of the compressor. Stated more specifically, if the inlet header has an increased internal volume in its entirety, the rate of flow of the refrigerant is lower therein, and unless a certain amount of the refrigerant collects in the entire interior of the inlet header of increased internal volume which is in communication with the heat exchange tubes, the refrigerant will not flow into the heat exchange tubes. For these reasons, it will take some time for the evaporator to start to become cool when the compressor is turned on. Conversely when the compressor is turned off, the rise in the temperature of the evaporator will involve variations to result in variations in the temperature of the air to be discharged from the evaporator because of the increased overall internal volume of the inlet header and also because of variations in the amount of refrigerant remaining in the inlet header with respect to the direction of parallel arrangement of the heat exchange tubes. Further when the inlet header has an increased internal volume and if the flow rate of the refrigerant is low, the refrigerant flowing into the inlet header will not smoothly flow to a location remote from the refrigerant inlet. A large amount of refrigerant will then flow into the heat exchange tubes of the front tube group which are located closer to the inlet than the other tubes, while a small amount of refrigerant will flow into the tubes which are remote from the inlet to result in a reduced flow rate. Even in the case of heat exchange tubes of the rear group, a large amount of refrigerant will flow into the tubes positioned close to the inlet, whereas a lesser amount of refrigerant will flow into the tubes which are remote from the inlet. As a result, the amount of refrigerant contributing to heat exchange involves variations throughout the heat exchange core with respect to the lengthwise direction of the inlet header tank, and the air passing through the heat exchange core also varies in temperature at different locations. Thus, the evaporator fails to exhibit fully improved heat exchange performance.

An object of the present invention is to overcome the above problem and to provide a heat exchanger which is outstanding in heat exchange performance.

DISCLOSURE OF THE INVENTION

To fulfill the above object, the present invention comprises the following modes.

1) A heat exchanger comprising a refrigerant inlet header having a refrigerant inlet at one end thereof, and a plurality of heat exchange tubes arranged at a spacing longitudinally of the inlet header and each having one end joined to the inlet header, the inlet header having interior divided by flow dividing control means into a first space for admitting a refrigerant thereinto through the refrigerant inlet and a second space communicating with the heat exchange tubes, the two spaces communicating with each other through a communication portion so that the refrigerant flows through the second space in a direction opposite to the direction of flow of the refrigerant in the first space.

2) A heat exchanger according to par. 1) wherein the refrigerant flows from the first space into the second space through the communication portion while making a U-turn so as to change its course.

3) A heat exchanger according to par. 2) wherein the two spaces of the inlet header communicate with each other through the communication portion at an end opposite to said one end having the refrigerant inlet.

4) A heat exchanger according to par. 1) wherein the communication portion comprises a communication hole formed in the control means.

5) A heat exchanger according to par. 1) wherein the control means is provided with a flow division adjusting hole for adjusting the division of flow of the refrigerant into the heat exchanger tubes joined to the inlet header.

6) A heat exchanger according to par. 5) wherein the flow division adjusting hole is formed in the control means at an end portion thereof closer to the refrigerant inlet.

7) A heat exchanger according to par. 5) wherein the two spaces of the inlet header communicate with each other through the communication portion at an end opposite to said one end having the refrigerant inlet, and the flow division adjusting hole is formed in the control means at a portion thereof opposite to the refrigerant inlet and positioned closer to the refrigerant inlet than the communication portion.

8) A heat exchanger according to par. 1) which comprises a refrigerant inlet header having a refrigerant inlet, a refrigerant outlet header positioned in the rear of the inlet header and having a refrigerant outlet, and a refrigerant circulating passage for causing the inlet header to communicate with the outlet header therethrough, the circulating passage comprising at least two intermediate headers and a plurality of heat exchange tubes for holding the inlet header, the outlet header and all the intermediate headers in communication therethrough.

9) A heat exchanger according to par. 8) which comprises a heat exchange core composed of tube groups in the form of a plurality of rows arranged in the front-rear direction, each of the tube groups comprising a plurality of heat exchange tubes arranged at a spacing, and fins arranged between respective adjacent pairs of heat exchange tubes, a refrigerant inlet header positioned toward one end of each of the heat exchange tubes and having joined thereto the heat exchange tubes of the tube group of at least one row, a refrigerant outlet header positioned toward said one end of each heat exchange tube and in the rear of the inlet header and having joined thereto the heat exchange tubes of tube group of at least one row, a refrigerant inflow intermediate header positioned toward the other end of each heat exchange tube and having joined thereto the heat exchange tubes joined to the inlet header, and a refrigerant outflow intermediate header positioned toward said other end of each heat exchange tube and in the rear of the inflow intermediate header and having joined thereto the heat exchange tubes joined to the outlet header.

10) A heat exchanger according to par. 9) wherein the heat exchange tubes are flat and are arranged with their widthwise direction pointing toward the front-rear direction and are 0.75 to 1.5 mm in height i.e., in the thickness of the tube.

11) A heat exchanger according to par. 9) wherein each the fins is a corrugated fin comprising crest portions, furrow portions and flat connecting portions each interconnecting the crest portion and the furrow portion, the fin being 7.0 to 10.0 mm in height, i.e., in the straight distance from the crest portion to the furrow portion and 1.3 to 1.7 mm in fin pitch, i.e., in the pitch of the connecting portions.

12) A heat exchanger according to par. 11) wherein the crest portion and the furrow portion of the corrugated fin each comprise a flat portion and a rounded portion provided at each of opposite sides of the flat portion and integral with the connecting portion, the rounded portion being up to 0.7 mm in radius of curvature.

13) A heat exchanger according to par. 8) wherein the inlet header and the outlet header are provided by dividing interior of one header tank with partition means into a front and a rear portion.

14) A heat exchanger according to par. 13) wherein the header tank comprises a first member having the heat exchange tubes joined thereto, a second member brazed to the first member at a portion thereof opposite to the heat exchange tubes, and two closure members brazed to opposite ends of the first and second members, the second member being integral with the control means and the partition means.

15) A heat exchanger according to par. 14) wherein one of the closure means has the refrigerant inlet communicating with the first space of the inlet header and the refrigerant outlet communicating with the outlet header.

16) A refrigeration cycle comprising a compressor, a condenser and an evaporator, the evaporator comprising a heat exchanger according to any one of pars. 1) to 15).

17) A vehicle having installed therein a refrigeration cycle according to par. 16) as an air conditioner.

With the heat exchanger according to any one of pars. 1) to 4), the interior of the inlet header is divided by flow dividing control means into a first space for admitting a refrigerant thereinto through the refrigerant inlet and a second space communicating with the heat exchange tubes, and the two spaces communicate with each other through a communication portion so that the refrigerant flows through the second space in a direction opposite to the direction of flow of the refrigerant in the first space. Accordingly, the refrigerant flows through the two spaces at a higher velocity than in the evaporator disclosed in the publication, and the space communicating with the heat exchange tubes is reduced in internal volume. When the compressor is turned on, therefore, a specified amount of refrigerant promptly collects in the second space to flow into the heat exchange tubes, shortening the time taken for the evaporator to start to cool. Conversely, when the compressor is turned off, variations in the amount of refrigerant remaining in the second space with respect to the direction of parallel arrangement of the tubes are diminished to result in a uniform rise in the temperature of the evaporator and give uniform temperature to the air to be discharged from the evaporator. The evaporator is accordingly responsive to the turning on and off of the compressor quickly. With the refrigerant flowing through the two spaces at a higher velocity, the refrigerant entering the inlet header, even if small in amount, flows through the entire second space more smoothly. The refrigerant flowing through all the heat exchange tubes joined to the inlet header is therefore made uniform in quantities, with the result that the amount of refrigerant contributing to heat exchange is uniformalized throughout the heat exchange core longitudinally of the inlet header, and the air passing through the core is also made uniform in temperature in its entirety for the heat exchanger to achieve a remarkably improved heat exchange efficiency. The impairment of heat exchange performance is prevented especially when the flow rate of the refrigerant is low.

In the event of variations occurring in the flow rate of the refrigerant or in the air flow velocity with respect to the lengthwise direction of the inlet header in the case of the heat exchanger according to par. 5), the division of flow of the refrigerant into the heat exchange tubes joined to the inlet header can be optimized.

In the case where the refrigerant flows through the heat exchanger according to par. 6) at a low rate, a large amount of refrigerant can be led to the portion of the second space remotest from the refrigerant. This results in an improved heat exchange efficiency.

When the rate of flow of the refrigerant increases, with an increase in the air flow velocity at the side away from the refrigerant inlet in the heat exchanger according to par. 7), an increased amount of refrigerant can be led to the side of the second space where the air flow velocity is greater. This lead x to an improved heat exchange efficiency.

With the heat exchanger according to par. 10), the heat exchange efficiency can be improved, with an increase in the air passage resistance suppressed to maintain a good balance therebetween.

With the heat exchanger according to par. 11), the heat exchange efficiency can be improved, and the increase in the air passage resistance suppressed, with a good balance maintained therebetween.

The heat exchanger according to par. 13) can be reduced in its entirety in the number of components.

With the heat exchanger according to par. 14), the flow dividing control means and the partition means are integral with the second member. The control means and the partition means can therefore be provided inside the header tank by simplified work.

BEST MODE OF CARRYING OUT THE INVENTION

An embodiment of the present invention will be described below with reference to the drawings. This embodiment is a heat exchanger of the invention as adapted for use as an evaporator in motor vehicle air conditioners wherein a chlorofluorocarbon refrigerant is used.

In the following description, the upper and lower sides and left-hand and right-hand sides of FIGS. 1 and 2 will be referred to as "upper," "lower," "left" and "right," respectively.

Figure 1:
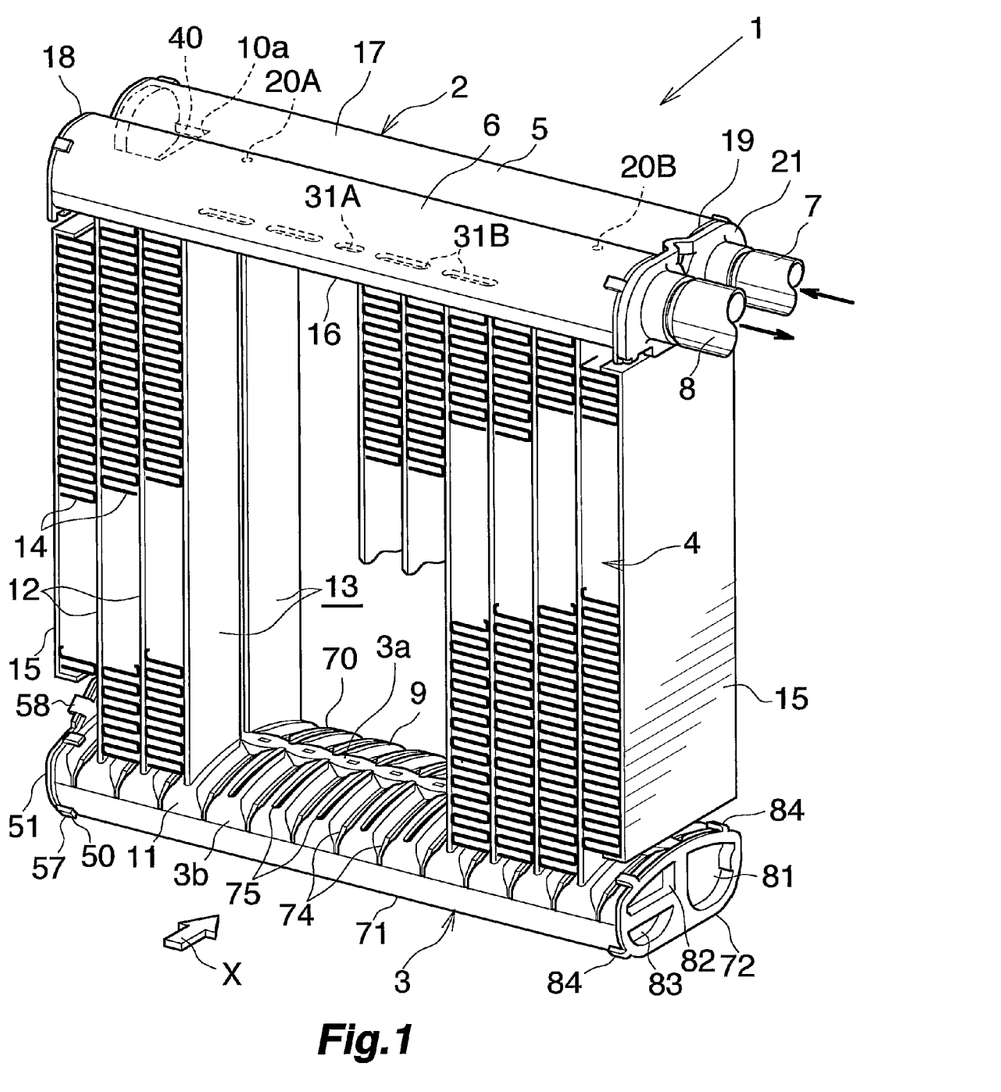
FIG. 1 is a perspective view partly broken away and showing the overall construction of a heat exchanger of the invention as adapted for use as an evaporator.
Figure 2:
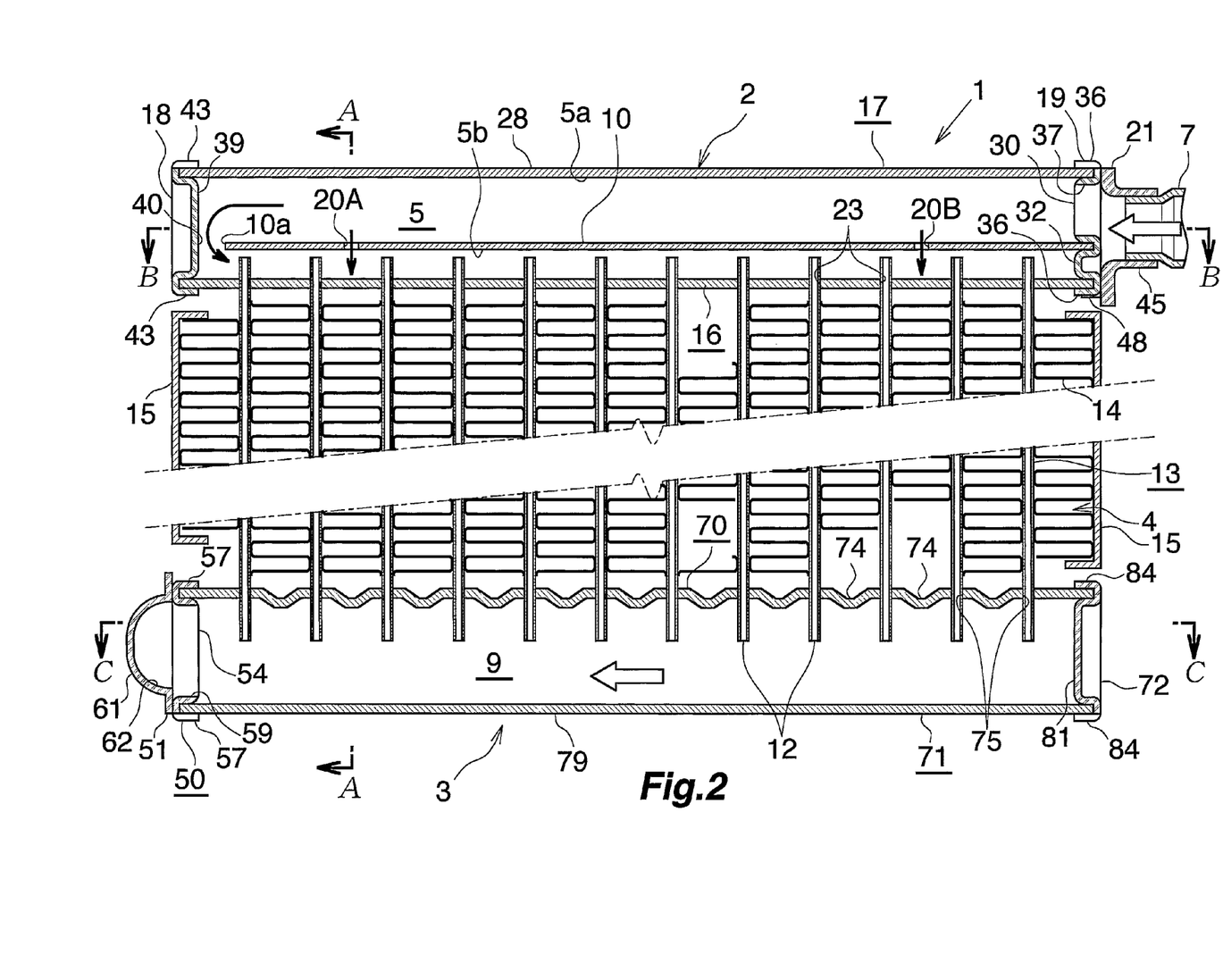
FIG. 2 is a view in vertical section showing the evaporator of FIG. 1 as it is seen from behind, with an intermediate portion omitted.
Figure 3:
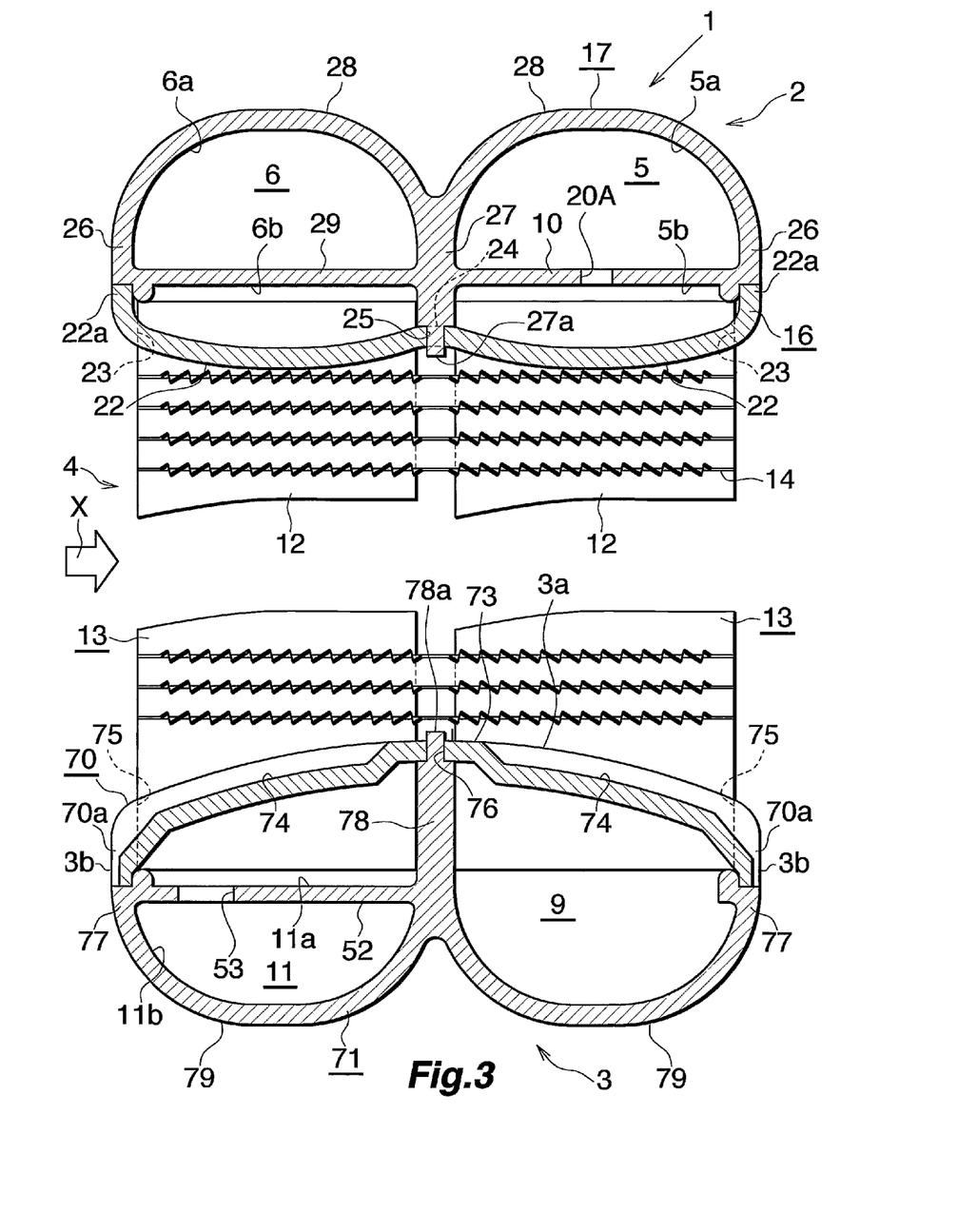
FIG. 3 is an enlarged fragmentary view in section taken along the line A-A in FIG. 2.
Figure 7:
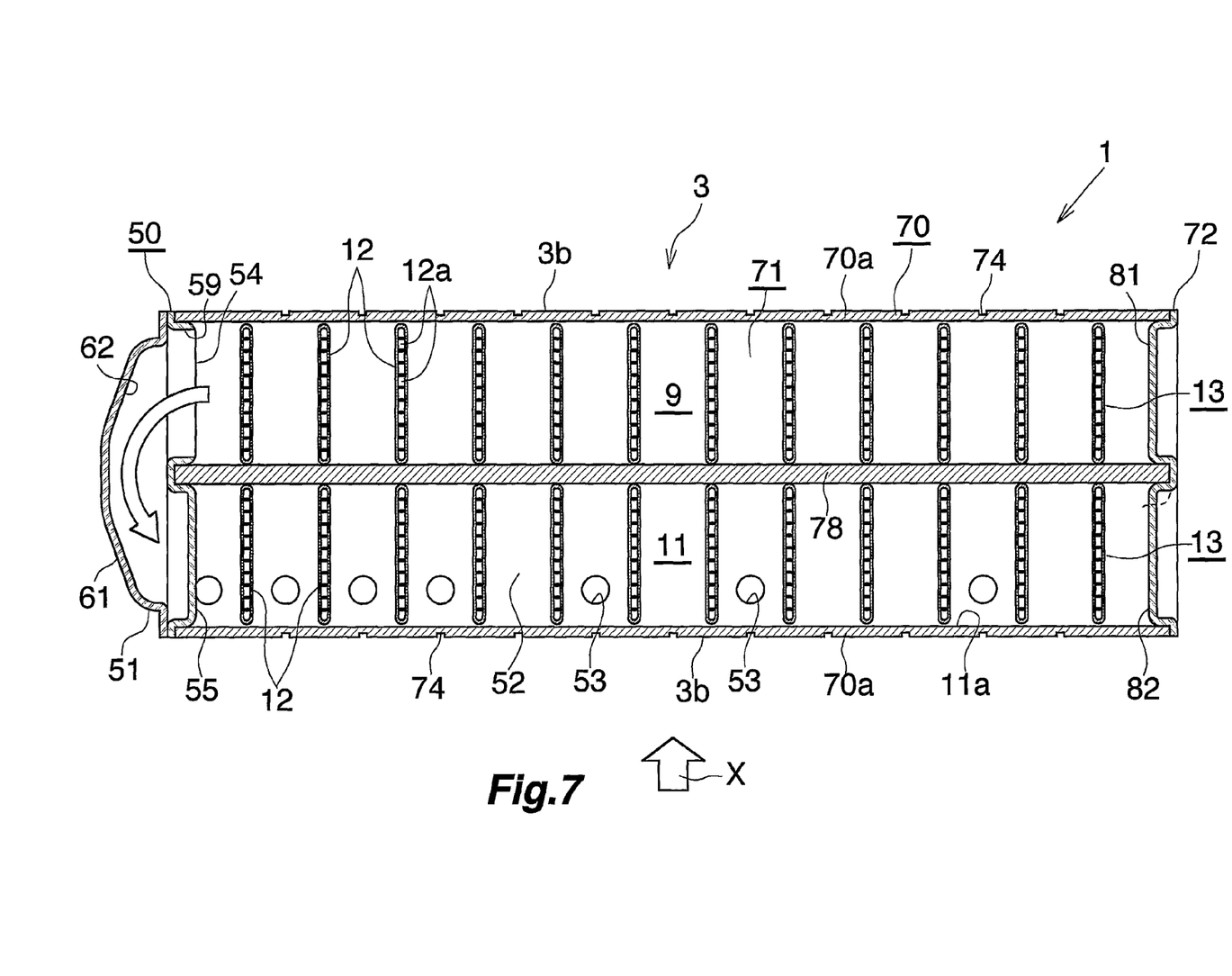
FIG. 7 is a view in section taken along the line C-C in FIG. 2.
Figure 8:
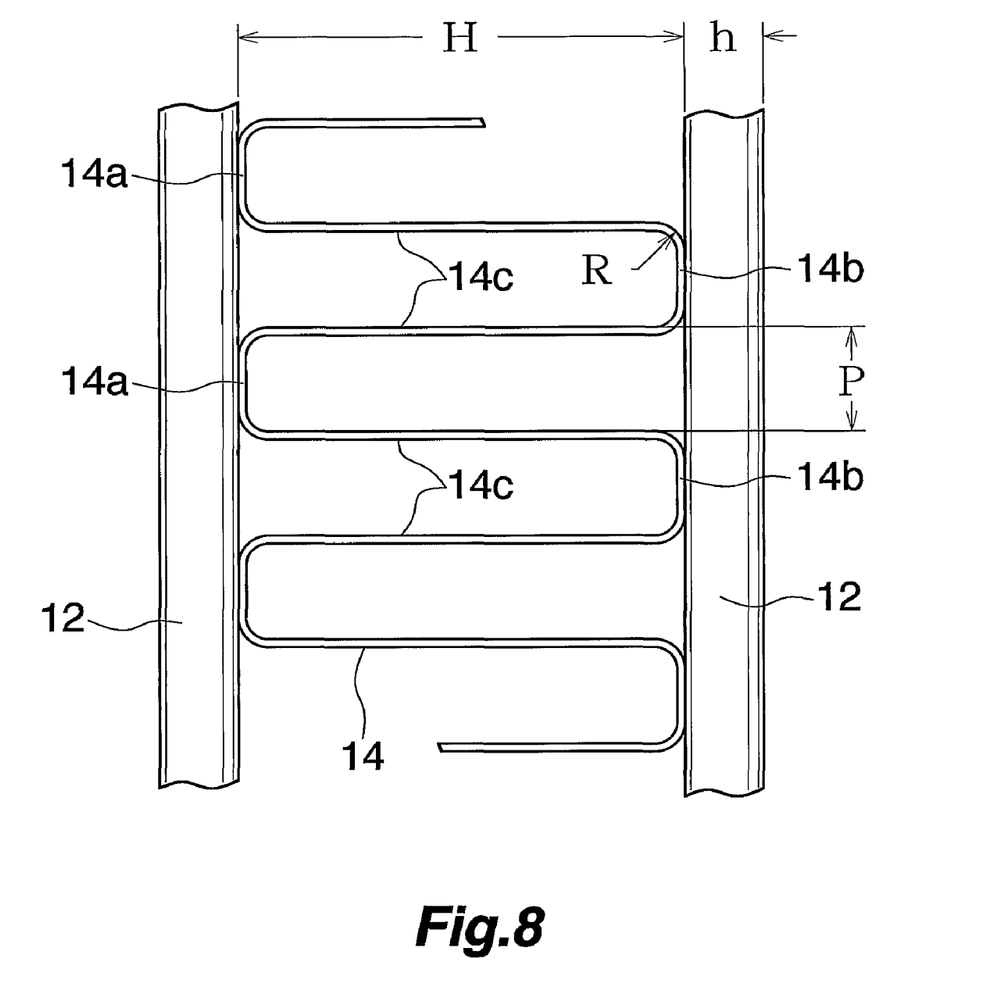
FIG. 8 is an enlarged view showing a portion of a heat exchange core of the evaporator shown in FIG. 1.
Figure 9:
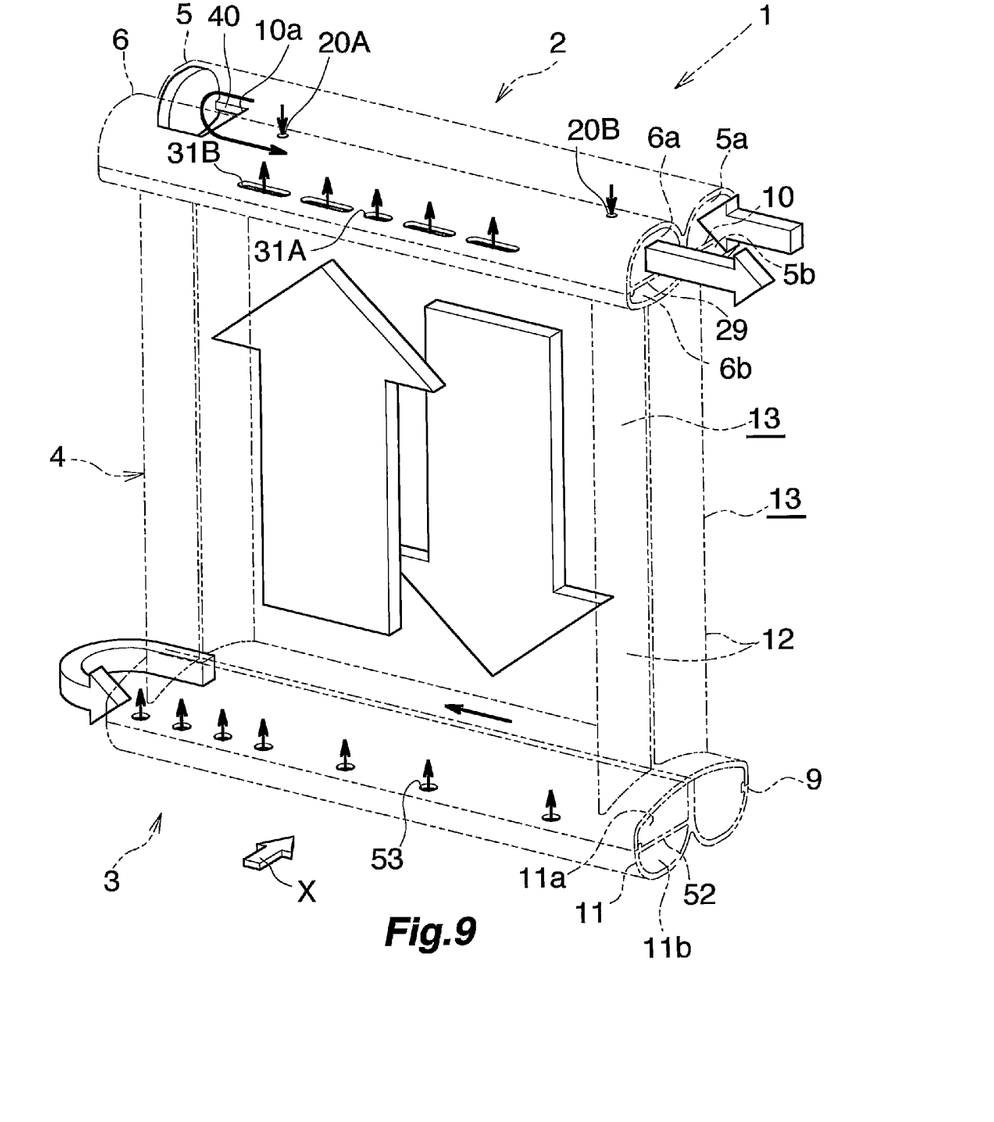
FIG. 9 is a diagram showing how a refrigerant flows through the evaporator shown in FIG. 1.

FIGS. 1 to 3 show the overall construction of an evaporator, FIGS. 4 to 8 show the constructions of main parts, and FIG. 9 shows how a refrigerant flows through the evaporator.

FIGS. 1 to 3 show an evaporator 1, which comprises a refrigerant inlet-outlet header tank 2 of aluminum and a refrigerant turn header tank 3 of aluminum which are arranged one above the other as spaced apart, and a heat exchange core 4 provided between the two tanks 2, 3.

The refrigerant inlet-outlet header tank 2 comprises a refrigerant inlet header 5 positioned on the front side (the downstream side with respect to the direction of flow of air through the evaporator), and a refrigerant outlet header 6 positioned on the rear side (the upstream side with respect to the flow of air). A refrigerant inlet pipe 7 of aluminum is connected to the inlet header 5 of the tank 2, and a refrigerant outlet pipe 8 of aluminum to the outlet header 6 of the tank. The refrigerant turn header tank 3 comprises a refrigerant inflow header 9 (refrigerant inflow intermediate header) positioned on the front side, and a refrigerant outflow header 11 (refrigerant outflow intermediate header) positioned on the rear side.

The heat exchange core 4 comprises tube groups 13 in the form of a plurality of rows, i.e., two rows in the present embodiment, as arranged in parallel in the front-rear direction, each tube group 13 comprising a plurality of heat exchange tubes 12 arranged in parallel in the left-right direction at a spacing. Corrugated fins 14 are arranged respectively in air passing clearances between respective adjacent pairs of heat exchange tubes 12 of tube groups 13 and also outside the heat exchange tubes 12 at the left and right opposite ends of the tube groups 13, and are each brazed to the heat exchange tube 9 adjacent thereto. An aluminum side plate 15 is disposed outside the corrugated fin 14 at each of the left and right ends and brazed to the fin 14. The heat exchange tubes 12 of the front tube group 13 have upper and lower ends joined to the inlet header 5 and the inflow header 9, respectively, and the heat exchange tubes 12 of the rear tube group 13 have upper and lower ends joined to the outlet header 6 and the outflow header 11, respectively.

With reference to FIGS. 2 to 5, the refrigerant inlet-outlet header tank 2 comprises a platelike first member 16 made of an aluminum brazing sheet having a brazing material layer over opposite surfaces thereof and having the heat exchange tubes 12 joined thereto, a second member 17 of bare aluminum extrudate and covering the upper side of the first member 16, and aluminum caps 18, 19 (closing members) made of an aluminum brazing sheet having a brazing material layer over opposite surfaces there and joined to opposite ends of the two members 16, 17 for closing the respective opposite end openings. An aluminum joint plate 21 elongated in the front-rear direction is brazed to the outer surface of the cap 19 at the right end to extend across both the inlet header 5 and the outlet header 6. The refrigerant inlet and outlet pipes 7, 8 are joined to the joint plate 21.

Figure 4:
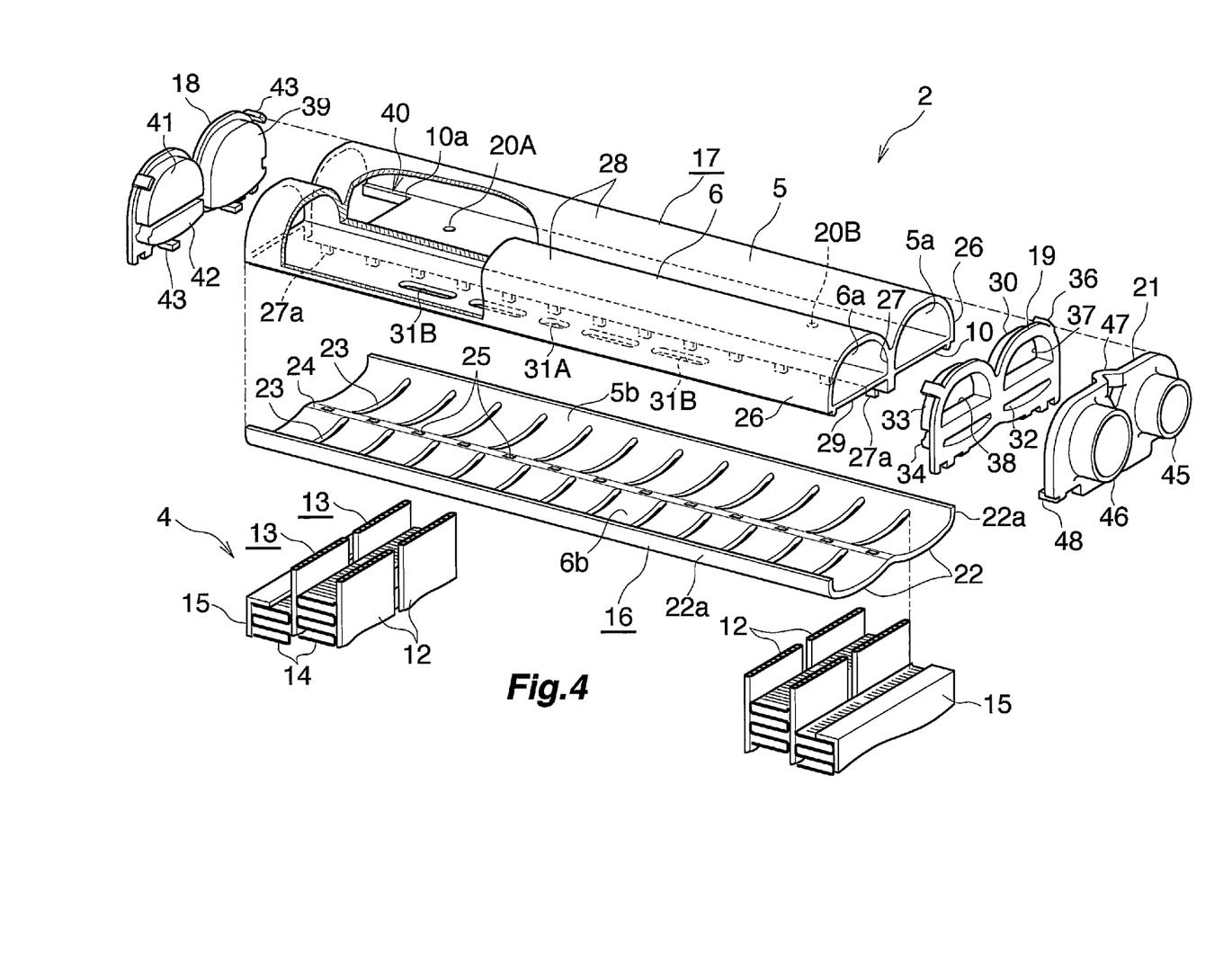
FIG. 4 is an exploded perspective view of a refrigerant inlet-outlet header tank of the evaporator shown in FIG. 1.
Figure 5:
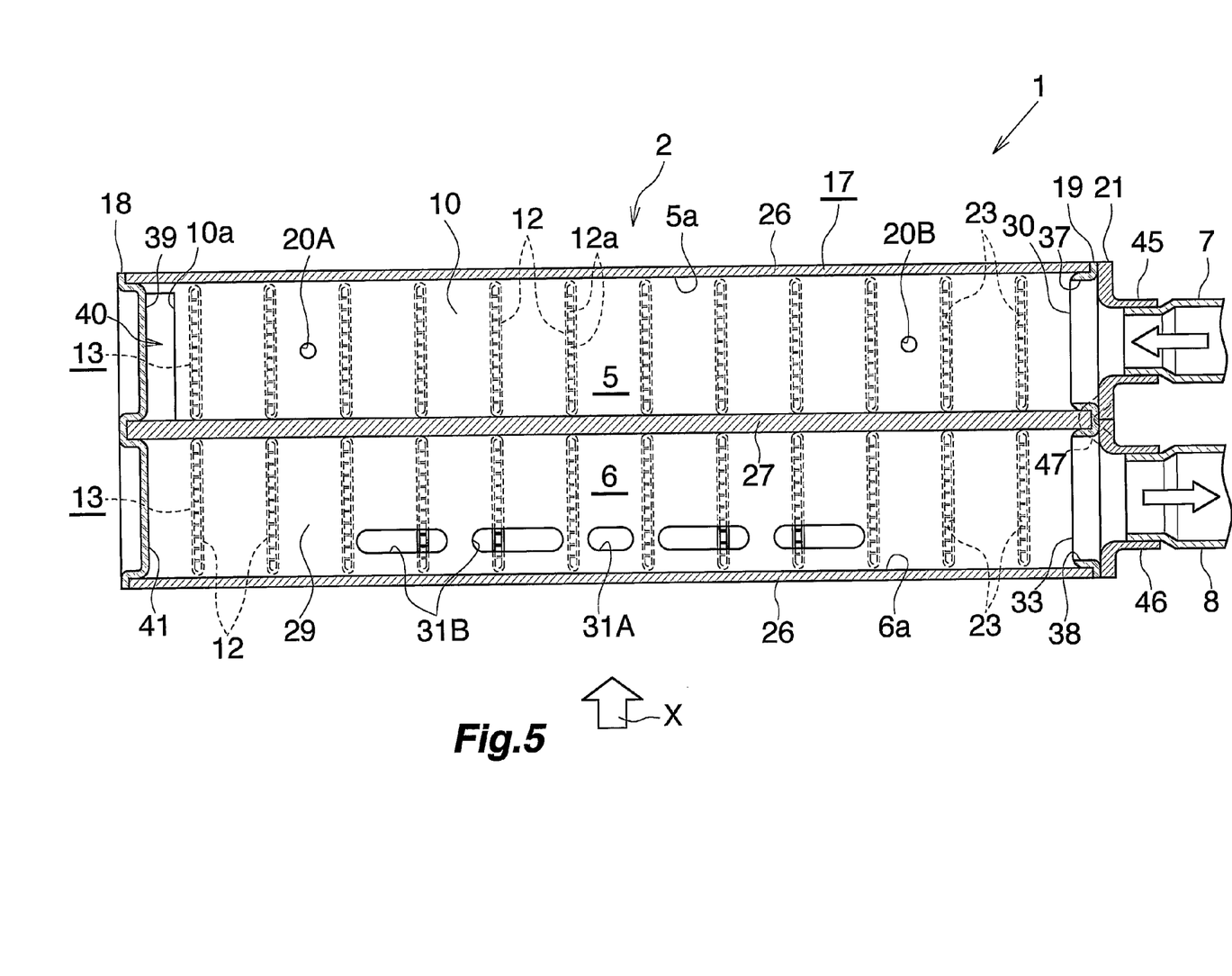
FIG. 5 is an enlarged view in section taken along the line B-B in FIG. 2.

The first member 16 has at each of the front and rear side portions thereof a curved portion 22 in the form of a circular arc of small curvature in cross section and bulging downward at its midportion. The curved portion 22 has a plurality of tube insertion slits 23 elongated in the front-rear direction and arranged at a spacing in the left-right, i.e., lateral, direction. Each corresponding pair of slits 23 in the front and rear curved portions 22 are in the same position with respect to the lateral direction. The front edge of the front curved portion 22 and the rear edge of the rear curved portion 22 are integrally provided with respective upstanding walls 22a extending over the entire length of the member 16. The first member 16 includes between the two curved portions 22 a flat portion 24 having a plurality of through holes 25 arranged at a spacing in the lateral direction.

The curved portions 22, upstanding walls 22a, tube insertion slits 23, flat portion 24 and through holes 25 are formed at the same time by making the first member 16 from an aluminum brazing sheet by press work.

The second member 17 is generally m-shaped in cross section and opened downward and comprises front and rear two walls 26 extending laterally, a partition wall 27 provided in the midportion between the two walls 26 and extending laterally as separating means for dividing the interior of the refrigerant inlet-outlet header tank 2 into front and rear two spaces, and two generally circular-arc connecting walls 28 bulging upward, having a generally circular-arc cross section and integrally connecting the partition wall 27 to the respective front and rear walls 26 at their upper ends.

The front wall 26 and the partition wall 27 of the second member 17 are integrally interconnected at their lower ends over the entire length of the member 17 by a flow dividing control wall 10 serving as flow dividing control means and provided inside the inlet header. At the same level as the flow dividing control wall 10, the rear wall 26 and the partition wall 27 of the second member 17 are integrally interconnected at their lower ends over the entire length of the member 17 by a flow dividing control wall 29 serving as flow dividing control means and provided inside the outlet header.

A cutout 10a is formed in the control wall 10 inside the inlet header. The wall 10 further has two flow division adjusting through holes 20A, 20B positioned close to the cutout 20a and to the right end of the wall, respectively. The control wall 29 in the outlet header has refrigerant passing oblong through holes 31A, 31B elongated laterally, formed therein at a rear portion thereof other than the left and right end portions of the wall and arrange data spacing laterally thereof. The oblong hole 31A in the midportion of the wall is smaller in length than the other oblong holes 31B and is positioned between an adjacent pair of heat exchange tubes 12 and is positioned between an adjacent pair of heat exchange tubes 12.

The partition wall 27 has a lower end projecting downward beyond the lower ends of the front and rear walls 26 and is integrally provided with a plurality of projections 27a projecting downward from the lower edge of the wall 27, arranged at a spacing in the lateral direction and fitted into the through holes 25 of the first member 16. The projections 27a are formed by cutting away specified portions of the partition wall 27.

The flow dividing control wall 10 is integral with the front wall 26 and the partition wall 27, and the flow dividing control wall 29 is integral with the rear wall 26 and the partition wall 27 according to the present embodiment, whereas a wall separate from the front wall 26 and the partition wall 27, and a wall separate from the rear wall 26 and the partition wall 27 may be fixed in position to provide the respective control walls 10 and 29.

The second member 17 is made by extruding front and rear walls 26, partition wall 27, connecting walls 28 and two control walls 10, 29 in the form of an integral piece, thereafter forming a cutout 10a and flow division adjusting holes 20A, 20B in the control wall 10 and refrigerant passing holes 20, 31A, 31B in the control wall 29 by press work and further cutting away portions of the partition wall 27 to make the projections 27a.

Each of the caps 18, 19 is in the form of a plate shaped generally in conformity with the cross sectional shape of the contour of combination of the first and second members 16, 17, and is made from an aluminum brazing sheet having a brazing material layer over opposite surfaces thereof by press work. The right cap 19 has a front portion integrally provided with an upper leftward protrusion 30 to be fitted into the upper part of the inlet header 5 above the control wall 10 and with a lower leftward protrusion 32 positioned below and spaced apart from the protrusion 30 and to be fitted into the lower part of the header 5 under the wall 10. The right cap 19 has a rear portion integrally provided with an upper leftward protrusion 33 to be fitted into the upper part of the outlet header 6 above the control wall 29 and with a lower leftward protrusion 34 positioned below and spaced apart from the protrusion 33 and to be fitted into the lower part of the header 6 under the wall 29. The right cap 19 has engaging lugs 36 projecting leftward and formed integrally therewith on a circular-arc portion between the upper edge thereof and each of the front and rear side edges thereof and also on each of front and rear portions of the lower edge thereof. The upper leftward protrusion 30 of the right cap 19 at the front portion thereof has a bottom wall provided with a refrigerant inlet 37. The upper leftward protrusion 33 of the cap 19 at the rear portion thereof has a bottom wall provided with a refrigerant outlet 38.

The left cap 18 has a front portion integrally provided with a rightward protrusion 39 to be fitted into the inlet header 5. The left cap 18 has a rear portion integrally provided with an upper rightward protrusion 41 to be fitted into the upper part of the outlet header 6 above the control wall 29 and with a lower rightward protrusion 42 positioned below and spaced apart from the protrusion 41 and to be fitted into the lower part of the header 6 under the wall 29. The left cap 18 has engaging lugs 43 projecting rightward and formed integrally therewith on a circular-arc portion between the upper edge thereof and each of the front and rear side edges thereof and also on each of front and rear portions of the lower edge thereof. No opening is formed in the bottom walls of the rightward protrusions 39, 41.

The joint plate 21 is made from a bare aluminum material by press work, and has a short cylindrical refrigerant inlet portion 45 communicating with the inlet 37 of the right cap 19, and a short cylindrical refrigerant outlet portion 46 communicating with the outlet 38 of the cap. The joint plate 21 has upper and lower edges each provided with a bent portion 47 projecting leftward and positioned between the inlet portion 45 and the outlet portion 46. The upper and lower bent portions 47 are in engagement with portions of the tank 2 between the inlet header 5 and the outlet header 6. The joint plate 21 further has engaging lugs 48 projecting leftward and formed integrally with the lower edge thereof respectively at its front and rear ends. The lugs 48 are engaged with the lower edge of the right cap 19.

The first and second members 16, 17 of the refrigerant inlet-outlet header tank 2, the two caps 18, 19 and the joint plate 21 are brazed together in the following manner. The first and second members 16, 17 are brazed to each other utilizing the brazing material layer of the first member 16, with the projections 27a of the second member 17 inserted through the respective through holes 25 of the first member 16 in crimping engagement therewith and with the upper ends of the front and rear upstanding walls 22a of the first member 16 thereby engaged with the lower ends of the front and rear walls 26 of the second member 17. The right cap 19 is brazed to the first and second members 16, 17 utilizing the brazing material layer of the cap 19, with the upper protrusion 30 of the front portion fitting in the upper space inside the two members 16, 17 forwardly of the partition wall 27 and above the control wall 10, with the lower protrusion 32 of the front portion fitting in the lower space inside the two members 16, 17 forwardly of the partition wall 27 and below the control wall 10, with the upper protrusion 33 of the rear portion fitting in the upper space inside the two members 16, 17 rearwardly of the partition wall 27 and above the control wall 29, with the lower protrusion 34 of the rear portion fitting in the lower space rearwardly of the partition wall 27 and below the control wall 29, with the upper engaging lugs 36 engaged with the connecting walls 28 of the second member 17, and with the lower engaging lugs 36 engaged with the curved portions 22 of the first member 16. The left cap 18 is brazed to the first and second members 16, 17 utilizing the brazing material layer of the cap 1, with the protrusion 39 of the front portion fitting in the space inside the two members 16, 17 forwardly of the partition wall 27, with the upper protrusion 41 of the rear portion fitting in the upper space inside the two members 16, 17 rearwardly of the partition wall 27 and above the control wall 29, with the lower protrusion 42 of the rear portion fitting in the lower space rearwardly of the partition wall 27 and below the control wall 29, with the upper engaging lugs 43 engaged with the connecting walls 28 of the second member 17, and with the lower engaging lugs 43 engaged with the curved portions 22 of the first member 16. The joint plate 21 is brazed to the right cap 19 utilizing the brazing material layer of the cap 19, with the upper bent portion 47 engaged in the midportion, with respect to the front-rear direction, of the right cap 19 and in the portion of the second member 17 between the two connecting walls 28, with the lower bent portion 47 engaged with the midportion, with respect to the front-rear direction, of the right cap 19 and the flat portion 24 of the first member 16, and with the engaging lugs 48 engaged with the lower edge of the cap 19.

In this way, the refrigerant inlet-outlet header tank 2 is made. The portion of the second member 17 forwardly of the partition wall 27 serves as the inlet header 2, and the portion of the member 17 rearward of the partition wall 27 as the outlet header 6. The inlet header 5 is divided by the flow dividing control wall 10 into upper and lower two spaces 5a, 5b, which are held in communication through the flow division adjusting holes 20A, 20B. The outlet header 6 is divided by the flow dividing control wall 29 into upper and lower two spaces 6a, 6b, which are held in communication by the oblong holes 31A, 31B. The refrigerant inlet 37 of the right cap 19 is in communication with the upper space 5a of the inlet header 5. The refrigerant outlet 38 is in communication with the upper space 6a of the outlet header 6. The refrigerant inlet portion 45 of the joint plate 21 communicates with the refrigerant inlet 37, and the refrigerant outlet portion 46 thereof communicates with the outlet 38. The upper space 5a of the inlet header 5 is a first space communicating with the inlet 37, and the lower space 5b thereof is a second space communicating with the heat exchange tubes 12 of the front group 13. The left-end opening provided by the cutout 10a in the inlet header flow dividing control wall 10 is closed with the left cap 18, whereby a communication hole 40 is provided through which the two spaces 5a, 5b are held in communication with each other at their left ends. Although the communication hole 40 is provided by closing the left-end opening of the cutout 10a with the left cap 18, a communication hole may be provided alternatively by forming a through hole in a left end portion of the control wall 10 instead of forming the cutout. The upper space 6a of the outlet header 6 is a first space communicating with the outlet 38, and the lower space 6b is a second space communicating with the heat exchange tubes 12 of the rear group 13.

With reference to FIGS. 2, 3, 6 and 7, the refrigerant turn header tank 3 comprises a platelike first member 70 made of aluminum brazing sheet having a brazing material layer over opposite surfaces thereof and having the heat exchange tubes 12 joined thereto, a second member 71 made of bare aluminum extrudate and covering the lower side of the first member 70, and aluminum caps 50, 72 (closing members) made of aluminum brazing sheet having a brazing material layer over opposite surfaces thereof for closing left and right opposite end openings. Brazed to the outer surface of the left cap 50 is a communication member 51 made of bare aluminum material, elongated in the front-rear direction and extending across both the inflow header 9 and the outflow header 11. The inflow header 9 and the outflow header 11 communicate with each other at their left ends through the communication member 51.

Figure 6:
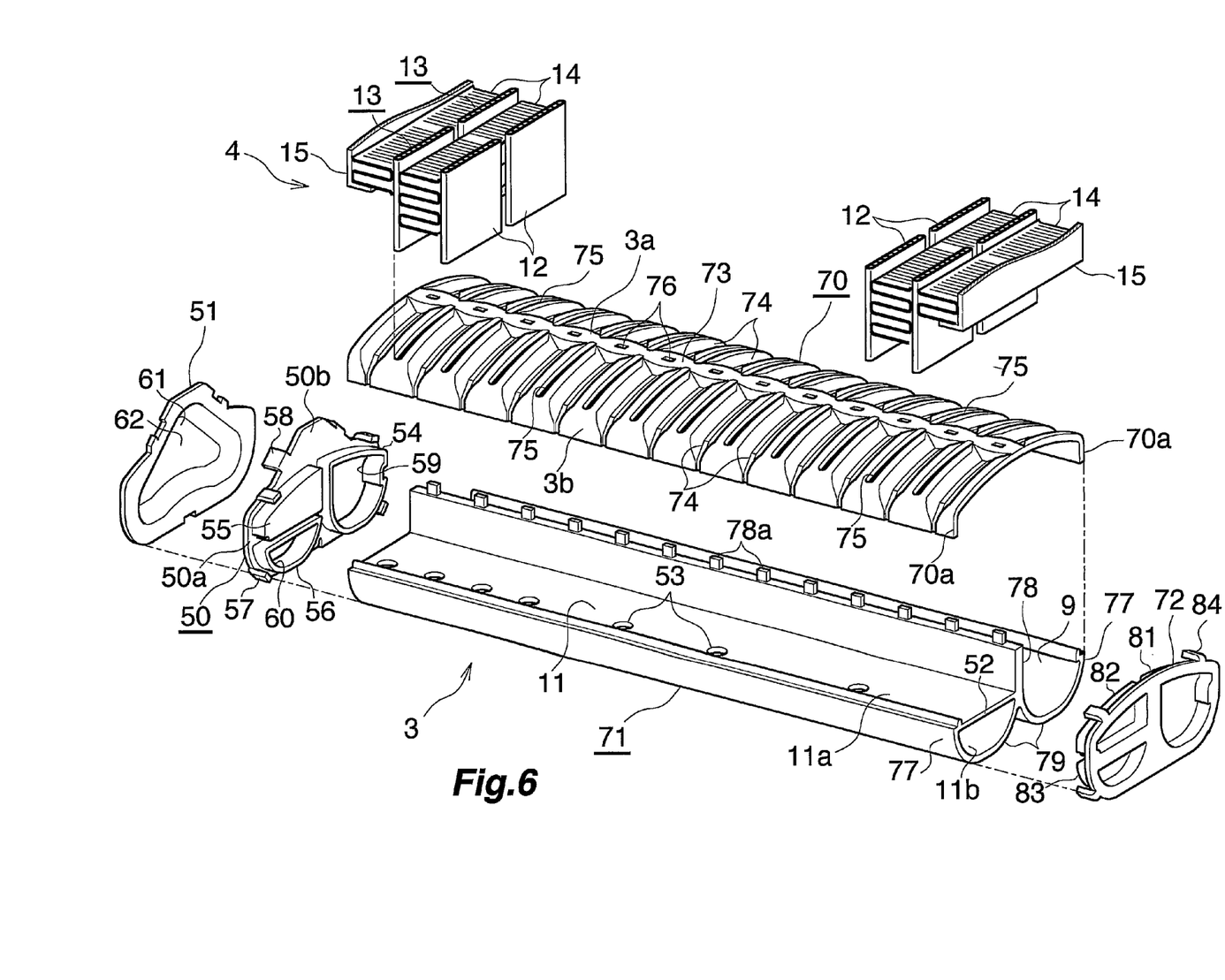
FIG. 6 is an exploded perspective view showing a refrigerant turn header tank of the evaporator shown in FIG. 1.

The refrigerant turn header tank 3 has a top surface 3a which is in the form of a circular-arc in cross section in its entirety such that the midportion thereof with respect to the front-rear direction is the highest portion 73 which is gradually lowered toward the front and rear sides. The tank 3 is provided in its front and rear opposite side portions with grooves 74 extending from the front and rear opposite sides of the highest portion 73 of the top surface 3a to front and rear opposite side surfaces 3b, respectively, and arranged laterally at a spacing.

The first member 70 has a circular-arc cross-section bulging upward at its midportion with respect to the front-rear direction and is provided with a depending wall 70a formed at each of the front and rear side edges thereof integrally therewith and extending over the entire length of the member 70. The upper surface of the first member 70 serves as the top surface 3a of the refrigerant turn header tank 3, and the outer surface of the depending wall 70a as the front or rear side surface 3b of the tank 3. The grooves 74 are formed in each of the front and rear side portions of the first member 70 and extend from the highest portion 73 in the midportion of the member 70 with respect to the front-rear direction to the lower end of the depending wall 70a. In each of the front and rear side portions of the first member 70 other than the highest portion 73 in the midportion thereof, tube insertion slits 75 elongated in the front-rear direction are formed between respective adjacent pairs of grooves 74. Each corresponding pair of front and rear tube insertion slits 75 are in the same position with respect to the lateral direction. The first member 70 has a plurality of through holes 76 formed in the highest portion 73 and arranged laterally at a spacing. The depending walls 70a, grooves 74, tube insertions slits 75 and through holes 76 of the first member 70 are formed at the same time by making the member 70 from an aluminum brazing sheet by press work.

The second member 71 is generally w-shaped in cross section and opened upward, and comprises front and rear two walls 77 curved upwardly outwardly forward and rearward, respectively, and extending laterally, a vertical partition wall 78, provided at the midportion between the two walls 77, extending laterally and serving as separating means for dividing the interior of the refrigerant turn header tank 3 into front and rear two spaces, and two connecting walls 79 integrally connecting the partition wall 78 to the respective front and rear walls 77 at their lower ends.

The upper end of the rear wall 77 of the second member 71 is integrally connected to the partition wall 78 by a flow dividing control wall 52 within the outflow header 11 over the entire length of the member 71. The control wall 52 has a plurality of refrigerant passing circular through holes 53 formed in the portion thereof to the rear of its midportion with respect to the front-rear direction. The intervals between respective adjacent pairs of circular holes 53 gradually increase as the wall extends rightward from its left end, with the result that the number of holes 53 per unit length of the wall 52 decreases rightward. Incidentally, the intervals between respective adjacent pairs of holes 53 may be all equal. The partition wall 78 has an upper end projecting upward beyond the upper ends of the front and rear walls 77 and is provided with a plurality of projections 78a projecting upward from the upper edge thereof integrally therewith, arranged laterally at a spacing and fitted into the respective through holes 76 in the first member 70. The projections 78a are formed by cutting away specified portions of the partition wall 78. Although the control wall 52 is made integral with the rear wall 77 and the partition wall 78, a wall separate from these walls 77, 78 may be fixed in position to provide the control wall 52 in the outflow header 11.

The second member 71 is made by extruding front and rear walls 77, partition wall 78, connecting walls 79 and flow dividing control wall 52 in the form of an integral piece, forming circular through holes 53 in the control wall 52 by press work and cutting away portions of the partition wall to make the projections 78a.

Each of the caps 50, 72 is in the form of a plate and made from an aluminum brazing sheet having a brazing material layer over opposite surfaces thereof by press work. The left cap 50 comprises a main body 50a shaped in conformity with the cross sectional shape of the contour of the combination of the first and second members 70, 71, and an upward protrusion 50b having a generally trapezoidal shape, integral with an intermediate portion, with respect to the front-rear direction, of the upper edge of the main body 50a and projecting upward beyond the first member 70. The main body 50a of the left cap 50 has a front portion integrally provided with a rightward protrusion 54 to be fitted into the inflow header 9, and a rear portion integrally provided with an upper rightward protrusion 55 to be fitted into the upper part of the outflow header 11 above the control wall 52 and with a lower rightward protrusion 56 positioned below and spaced apart from the protrusion 55 and to be fitted into the lower part of the header 11 under the wall 52. The left cap 50 has engaging lugs 57 projecting rightward and formed on a circular-arc portion between the lower edge thereof and each of the front and rear side edges thereof and also on a portion of the upper edge thereof closer to each of the front and rear ends thereof. The left cap main body 50a further has engaging rugs 58 projecting leftward and formed on opposite slopes of the upward protrusion 50b thereof and on the lower edge thereof at its midportion with respect to the front-rear direction. Through holes 59, 60 are formed respectively in the bottom wall of the front rightward protrusion 54 of the left cap 50 and in the bottom wall of rear lower rightward protrusion 56 of the cap. The front hole 59 causes the interior of the inflow header 9 to communicate with the outside, and the rear hole 60 causes the lower space of the outflow header 11 below the control wall 52 to communicate with the outside.

The right cap 72 has a front portion integrally provided with a leftward protrusion 81 fittable into the inflow header 9, and a rear portion integrally provided with an upper leftward protrusion 82 to be fitted into the upper part of the outflow header 11 above the control wall 52 and with a lower leftward protrusion 83 positioned below and spaced apart from the protrusion 82 and to be fitted into the lower part of the header 11 under the wall 52. The right cap 72 has engaging lugs 84 projecting leftward and integrally formed on a circular-arc portion between the lower edge thereof and each of the front and rear side edges thereof and also on a portion of the upper edge thereof closer to each of the front and rear ends thereof. No through hole is formed in the rightward protrusion 81 or in the lower rightward protrusion 83.

The communication member 51 is made from a bare aluminum material by press work. When seen from the left side, the member 51 is in the form of a plate having the same size and shape as the left cap 50 and has a peripheral edge portion brazed to the outer surface of the left cap 50. The communication member 51 is provided with an outwardly bulging portion 61 for holding the two through holes 59, 60 of the left cap 50 in communication therethrough. The interior of the bulging portion 61 provides a communication channel 62 for holding the holes 59, 60 of the cap 50 in communication. The bulging portion 61 has an upper end positioned at the upper end of the upward protrusion 50b of the left cap 50. This gives a large area to the communication channel 62 although the space available is limited.

The first and second members 70, 71, the two caps 50, 72 and the communication member 51 of the turn header tank 3 are brazed together in the following manner. The first and second members 70, 71 are brazed to each other utilizing the brazing material layer of the first member 70, with the projections 78a of the second member 71 inserted through the respective holes 76 in crimping engagement and with the lower ends of front and rear depending walls 70a of the first member 70 in engagement with the upper ends of front and rear walls 77 of the second member 71. The two caps 50, 72 are brazed to the first and second members 70, 71 using the brazing material layers of the caps 50, 72, with the front protrusions 54, 81 fitted in the space defined by the two members 70, 71 and positioned forwardly of the partition wall 78, with the rear upper protrusions 55, 82 fitted in the upper space defined by the two members 70, 71 and positioned rearwardly of the partition wall 78 and above the flow dividing control wall 52, with the rear lower protrusions 56, 83 fitted in the lower space defined by the two members 70, 71 and positioned rearwardly of the partition wall 78 and below the flow dividing control wall 52, with the upper engaging lugs 57, 84 engaged with the first member 70 and with the lower engaging lugs 57 engaged with the front and rear walls 77 of the second member 71. The communication member 51 is brazed to the left cap 50 utilizing the brazing material layer of the cap 50, with the engaging lugs 58 of the cap 50 in engagement with the communication member 51.

In this way, the refrigerant turn header tank 3 is formed. The portion of the second member 71 forwardly of the partition wall 78 serves as the inflow header 9, and the portion thereof rearwardly of the partition wall 78 as the outflow header 11. The outflow header 11 is divided by the flow dividing control wall 52 into upper and lower two spaces 11a, 11b, which are held in communication through the circular refrigerant passing holes 53. The rear through hole 60 of the left cap 50 communicates with the lower space 11b of the outflow header 11. The interior of the inflow header 9 is held in communication with the lower space 11b of the outflow header 11 by way of the through holes 59, 60 of the left cap 50 and the communication channel 62 in the outwardly bulging portion 61 of the communication member 51. The lower space 11b of the outflow header 11 is a first space communicating with the inflow header 9, and the upper space 11a is a second space communicating with the heat exchange tubes 12 of the rear tube group 13.

The heat exchange tubes 12 providing the front and rear tube groups 13 are each made of a bare material of aluminum extrudate. Each tube 12 is flat, has a large width in the front-rear direction and is provided in its interior with a plurality of refrigerant channels 12a extending longitudinally of the tube and arranged in parallel (see FIGS. 5 and 7). The tube 12 has front and rear end walls outwardly bulging in a circular-arc form. The heat exchange tubes 12 of the front group 13 are in alignment with the corresponding tubes of the rear group with respect to the lateral direction. The tubes 12 have upper end portions inserted through the slits 23 in the first member 16 of the refrigerant inlet-outlet header tank 2 and are brazed to the first member 16 utilizing the brazing material layer of the member 16. The tubes 12 have lower end portions inserted through the slits 75 in the first member 70 of the refrigerant turn header tank 3 and are brazed to the first member 70 utilizing the brazing material layer of the member 70. The tubes 12 of the front group 13 communicate with the inlet header 5 and the inflow header 9, and the tubes 12 of the rear group 13 with the outlet header 6 and the outflow header 11.

Preferably, the heat exchange tube 12 is 0.75 to 1.5 mm in height h, i.e., in thickness in the lateral direction (see FIG. 8), 12 to 18 mm in width in the front-rear direction, 0.175 to 0.275 mm in the wall thickness of the peripheral wall thereof, 0.175 to 0.275 mm in the thickness of partition walls separating refrigerant channels 12a from one another, 0.5 to 3.0 mm in the pitch of partition walls, and 0.35 to 0.75 mm in the radius of curvature of the outer surfaces of the front and rear opposite end walls.

In place of the heat exchange tube 12 of aluminum extrudate, an electric resistance welded tube of aluminum may be used which has a plurality of refrigerant channels formed therein by inserting inner fins into the tube. Also usable is a tube made from a plate which is prepared from an aluminum brazing sheet having an aluminum brazing material layer over opposite surfaces thereof by rolling work and which comprises two flat wall forming portions joined by a connecting portion, a side wall forming portion formed on each flat wall forming portion integrally therewith and projecting from one side edge thereof opposite to the connecting portion, and a plurality of partition forming portions projecting from each flat wall forming portion integrally therewith and arranged at a spacing widthwise thereof. The tube is made by bending the plate into the shape of a hairpin at the connecting portion and brazing the side wall forming portions to each other in butting relation to form partition walls by the partition forming portions. The corrugated fins to be used in this case are those made from a bare aluminum material.

FIG. 8 shows a corrugated fin 14 made from an aluminum brazing sheet having a brazing material layer on opposite sides thereof by shaping the sheet into a wavy form. The fin comprises crest portions 14a, furrow portions 14b and flat horizontal connecting portions 14c each interconnecting the crest portion 14a and the furrow portion 14b. The connecting portion 14c has a plurality of louvers (not shown) arranged in the front-rear direction. The corrugated fin 14 is used in common for the front and rear heat exchange tubes. The width of the fin 14 in the front-rear direction is approximately equal to the distance from the front edge of the heat exchange tube 12 on the front side to the rear edge of the corresponding heat exchange tube 12 on the rear side (see FIG. 3). The crest portions 14a and the furrow portions 14b of the fin 14 are brazed to the heat exchange tubes 12 adjacent thereto. Instead of one corrugated fin serving for both the front and rear tube groups 13 in common, a corrugated fin may be provided between each adjacent pair of heat exchange tubes 12 of each tube group 13.

It is desired that the corrugated fin 14 be 7.0 mm to 10.0 mm in fin height H which is the straight distance from the crest portion 14a to the furrow portion 14b, and 1.3 to 1.7 mm in fin pitch P which is the pitch of connecting portions 14c. While the crest portion 14a and the furrow portion 14b of the corrugated fin 14 each comprise a flat portion brazed to the heat exchange tube 12 in intimate contact therewith, and a rounded portion provided at each of opposite sides of the flat portion and integral with the connecting portion 14c, the radius R of curvature of the rounded portion is preferably up to 0.7 mm.

The evaporator 1 is fabricated by tacking the components in combination and brazing all the components collectively.

Along with a compressor, a condenser and expansion valve, the evaporator 1 constitutes a refrigeration cycle wherein a chlorofluorocarbon refrigerant is used and which is installed in vehicles, for example, in motor vehicles for use as an air conditioner.

With reference to FIG. 9 showing the evaporator 1 described, a two-layer refrigerant of vapor-liquid mixture phase flowing through a compressor, condenser and expansion valve enters the upper space 5a of the refrigerant inlet header 5 of the inlet-outlet header tank 2 via the refrigerant inlet pipe 7, the refrigerant inlet portion 45 of the joint plate 21 and the refrigerant inlet 37 of the right cap 19. The refrigerant entering the upper space 5a flows leftward through this space 5a, makes a U-turn to change its course by passing through the communication hole 40 of the flow dividing control wall 10, enters the lower space 5b, flows through the space 5b rightward in a direction opposite to the direction of flow in the upper space 5a, and dividedly flows into the refrigerant channels 12a of all the heat exchange tubes 12 of the front group 13.

The refrigerant flowing into the channels 12a of the heat exchange tubes 12 flows down the channels 12a, and ingresses into the refrigerant inflow header 9 of the refrigerant turn header tank 3. The refrigerant in the header 9 flows leftward, further flows through the front through hole 59 of the left cap 50, the communication channel 62 inside the outwardly bulging portion 61 of the communication member 51 and the rear through hole 60 of the left cap 50, thereby changing its course to turn, and enters the lower space 11b of the outflow header 11.

Even if the refrigerant fails to dividedly flow into the heat exchange tubes 12 of the front group 13 fully uniformly and consequently becomes uneven in the distribution of temperatures (qualities of wet vapor) while flowing through the tubes 12 of the front group 13, the refrigerant is agitated and becomes uniform in temperature in its entirety when flowing from the inlet header 6 into the lower space 11b of the outflow header 11 upon turning.

The refrigerant entering the lower space 11b of the outflow header 11 flows rightward, flows into the upper space 11a through the refrigerant passing circular holes 53 in the flow dividing control wall 52 within the outflow header 11 and dividedly flows into the refrigerant channels 12a of all the heat exchange tubes 12 of the rear group 13.

The refrigerant entering the refrigerant channels 12a of the tubes 12 flows up the channels 12a upon changing its course, flows into the lower space 6b of the outlet header 6 and then flows into the upper space 6a through the refrigerant passing oblong holes 31A, 31B in the flow dividing control wall 29 within the outlet header 6. Since the control wall 29 offers resistance to the flow of refrigerant, the divided flows from the upper space 11a of the outflow header 11 into the tubes 12 of the rear group 13 are made uniform, also permitting the refrigerant to flow from the lower space 5b of the inlet header 5 dividedly into the tubes 12 of the front group 13 also uniformly. As a result, the refrigerant flows through all tubes 12 of the two groups 13 uniformly to give a uniform temperature distribution to the entire heat exchange core 4.

The refrigerant flowing into the upper space 6a of the outlet header 6 thereafter flows out of the evaporator via the refrigerant outlet 38 of the right cap 19, the outlet portion 46 of the joint plate 21 and the outlet pipe 8. While flowing through the refrigerant channels 12a of the heat exchange tubes 12 of the front tube group 13 and the refrigerant channels 12a of the heat exchange tubes 12 of the rear tube group 13, the refrigerant is subjected to heat exchange with the air flowing through the air passing clearances in the direction of arrow X shown in FIGS. 1 and 9 and flows out of the evaporator in a vapor phase.

At this time, water condensate is produced on the surfaces of the corrugated fins 14 to flow down the top surface 3a of the turn header tank 3. The condensate flowing down the tank top surface 3a enters the grooves 74 by virtue of a capillary effect, flows through the grooves 74 and falls off the forwardly or rearwardly outer ends of the grooves 74 to below the turn header tank 3. This prevents a large quantity of condensate from collecting between the top surface 3a of the turn header tank 3 and the lower ends of the corrugated fins 14, consequently preventing the condensate from freezing due to the collection of large quantity of the condensate, whereby inefficient performance of the evaporator 1 is precluded.

Since the inlet header 5 is divided by the flow dividing control wall 10 provided therein into the upper and lower spaces 5a, 6b, the two spaces 5a, 5b are given a relatively small internal volume, permitting the refrigerant to flow therethrough at a higher velocity and reducing the internal volume of the lower space 5b in communication with the heat exchange tubes 12. When the compressor is turned on, therefore, a specified amount of refrigerant collects in the lower space 5b promptly to flow into the heat exchange tubes 12, enabling the evaporator 1 to start to cool within a shortened period of time. Conversely when the compressor is turned off, variations in the amount of refrigerant remaining in the lower space 5b with respect to the left-right direction are diminished, permitting the evaporator 1 to rise in temperature uniformly and the air flowing through the heat exchange core 4 to be discharged therefrom at a uniform temperature. Thus, the evaporator 1 is responsive to the turning on and off of the compressor more quickly. The increased velocity of the flow of refrigerant through the spaces 5a, 5b enables the refrigerant flowing into the inlet header 5 to flow through the entire lower space 5b more smoothly even if the amount of refrigerant is small, allowing the refrigerant to flow through all the heat exchange tubes 12 of the front group 13 in uniform quantities. As a result, the amount of refrigerant contributing to heat exchange is made uniform throughout the heat exchange core 4 with respect to the left-right direction, and the air passing through the core 4 is also made uniform in its entirety. Thus, the evaporator 1 exhibits remarkably improved heat exchange performance.

The refrigerant flowing into the upper space 5a of the inlet header 5 in the case where the flow rate of the refrigerant is small flows also through the flow division adjusting hole 20B at the right directly to the right end portion of the lower space 5b, i.e., to the portion of the lower space 5b which is remotest from the refrigerant inlet 37, so that a large amount of refrigerant can be led to the right end portion of the lower space 5b which is not smoothly accessible by the refrigerant when the flow rate thereof is low. This uniformalizes the quantities of refrigerant flowing through the heat exchange tubes 12 of the front group 13 for the evaporator 1 to achieve an improved heat exchange efficiency.

On the other hand, when the flow rate of the refrigerant is high and when air passes through the left side of the heat exchange core 4 at a higher velocity, a large amount of refrigerant can be passed through the heat exchange tubes 12 of the front group 13 which are positioned on the left side of higher air velocity and higher heat exchange efficiency since the refrigerant entering the upper space 5a of the inlet header 5 flows into the left end portion of the lower space 5b also through the flow division adjusting hole 20A on the left side.

One group 13 of heat exchange tubes is provided between the inlet header 5 and the inflow header 9 of the two tanks 2, 3, as well as between the outlet header 6 and the outflow header 11 thereof according to the foregoing embodiment, whereas this arrangement is not limitative; one or at least two groups 13 of heat exchange tubes may be provided between the inlet header 5 and the inflow header 9 of the two tanks 2, 3, as well as between the outlet header 6 and the outflow header 11 thereof. Although the inlet-outlet header tank 2 is positioned above the turn header tank 3 according to the above embodiment, the evaporator may be used with the turn header tank 3 positioned above the inlet-outlet header tank 2.

Although the turn header tank 3 has grooves 74 between respective adjacent pairs of heat exchange tubes 12 to achieve an improved drainage efficiency according to the above embodiment, the arrangement of grooves 74 is not limitative; grooves may be provided as opposed to the respective heat exchange tubes 12 for improved drainage. In this case, grooves for improved drainage are provided in the top surface 3a of the tank 3 to the front and rear side surfaces 3b thereof while being made to extend from the forwardly or rearwardly outer ends of the respective tube insertion slits 75.

Although the inflow header 9 of the turn header tank 3 communicates with the lower space 11b of the outflow header 11 at the end of the tank 3 opposite to the refrigerant inlet 37 of the inlet header 5, the communication may conversely be made at the same end as the inlet 37.

Although a heat exchanger of the invention is used as an evaporator according to the foregoing embodiment, this mode of embodiment is not limitative.

The heat exchanger of the invention is used also in vehicles, for example, motor vehicles equipped with a motor vehicle air conditioner which comprises a compressor, gas cooler, intermediate heat exchanger, pressure reducer and evaporator and wherein $CO_2$ or like supercritical refrigerant is used, to serve as the evaporator of the air conditioner.

INDUSTRIAL APPLICABILITY

A heat exchanger of the invention is suitable, for example, for use as an evaporator in motor vehicle air conditioners which are refrigeration cycles to be installed in motor vehicles.

The invention claimed is:
1. A heat exchanger comprising:
   a refrigerant inlet header having a refrigerant inlet at one end thereof; and
   a plurality of heat exchange tubes extending vertically and arranged at a spacing longitudinally of the inlet header and each having an upper end joined to the inlet header,
   wherein the inlet header having has an interior portion divided by a flow dividing control means device into a first space and a second space parallel to and below the first space, the first space admitting a refrigerant thereinto through the refrigerant inlet, the upper end of each of the heat exchange tubes communicating with only the second space and a communication portion provided to communicate the first and second spaces, and the refrigerant flows from the first space into the second space through the communication portion while making a U-turn from the first space to the second space so as to change a course opposite to a direction of flow of the refrigerant in the first space.

2. A heat exchanger according to claim 1 wherein the communication portion comprises a communication hole formed in the control device.

3. A heat exchanger according to claim 1 wherein the control device is provided with a flow division adjusting hole for communicating the first space and the second space and adjusting the division of flow of the refrigerant into the heat exchanger tubes joined to the second space of the inlet header.

4. A heat exchanger according to claim 3 wherein the flow division adjusting hole is formed in the control device at an end portion thereof closer to the refrigerant inlet.

5. A heat exchanger according to claim 3 wherein the two spaces of the inlet header communicate with each other through the communication portion at an end opposite to said one end having the refrigerant inlet, and the flow division adjusting hole is formed in the control device at a portion thereof opposite to the refrigerant inlet and positioned closer to the refrigerant inlet than the communication portion.

6. A heat exchanger according to claim 1 which comprises a refrigerant inlet header having a refrigerant inlet, a refrigerant outlet header positioned in the rear of the inlet header and having a refrigerant outlet, and a refrigerant circulating passage for causing the inlet header to communicate with the outlet header therethrough, the circulating passage comprising at least two intermediate headers and a plurality of heat exchange tubes for holding the inlet header, the outlet header and all the intermediate headers in communication therethrough.

7. A heat exchanger according to claim 6 which comprises a heat exchange core comprising tube groups in the form of a plurality of rows arranged in the front-rear direction, each of the tube groups comprising a plurality of heat exchange tubes arranged at a spacing, and fins arranged between respective adjacent pairs of heat exchange tubes, a refrigerant inlet header positioned toward one end of each of the heat exchange tubes and having joined thereto the heat exchange tubes of the tube group of at least one row, a refrigerant outlet header positioned toward said one end of each heat exchange tube and in the rear of the inlet header and having joined thereto the heat exchange tubes of tube group of at least one row, a refrigerant inflow intermediate header positioned toward the other end of each heat exchange tube and having joined thereto the heat exchange tubes joined to the inlet header, and a refrigerant outflow intermediate header positioned toward said other end of each heat exchange tube and in the rear of the inflow intermediate header and having joined thereto the heat exchange tubes joined to the outlet header.

8. A heat exchanger according to claim 7 wherein the heat exchange tubes are flat and are arranged with a widthwise direction of the heat exchange tubes pointing toward the front-rear direction and are 0.75 to 1.5 mm in height which is in the thickness of the tube.

9. A heat exchanger according to claim 7 wherein each the fins is a corrugated fin comprising crest portions, furrow portions and flat connecting portions each interconnecting the crest portion and the furrow portion, the fin being 7.0 to 10.0 mm in height which is in the straight distance from the crest portion to the furrow portion and 1.3 to 1.7 mm in fin pitch which is in the pitch of the connecting portions.

10. A heat exchanger according to claim 9 wherein the crest portion and the furrow portion of the corrugated fin each comprise a flat portion and a rounded portion provided at each of opposite sides of the flat portion and integral with the connecting portion, the rounded portion being up to 0.7 mm in radius of curvature.

11. A heat exchanger according to claim 6 wherein the inlet header and the outlet header are provided by dividing interior of one header tank with a partition device into a front and a rear portion.

12. A heat exchanger according to claim 11 wherein the header tank comprises a first member having the heat exchange tubes joined thereto, a second member brazed to the first member at a portion thereof opposite to the heat exchange tubes, and two closure members brazed to opposite ends of the first and second members, the second member being integral with the control device and the partition device.

13. A heat exchanger according to claim 12 wherein one of the closure members has the refrigerant inlet communicating with the first space of the inlet header and the refrigerant outlet communicating with the outlet header.

14. A refrigeration cycle comprising an evaporator, the evaporator comprising a heat exchanger according to claim 1.

15. A vehicle having installed therein a refrigeration cycle according to claim 14 as an air conditioner.

* * * * *